Patented Nov. 14, 1939

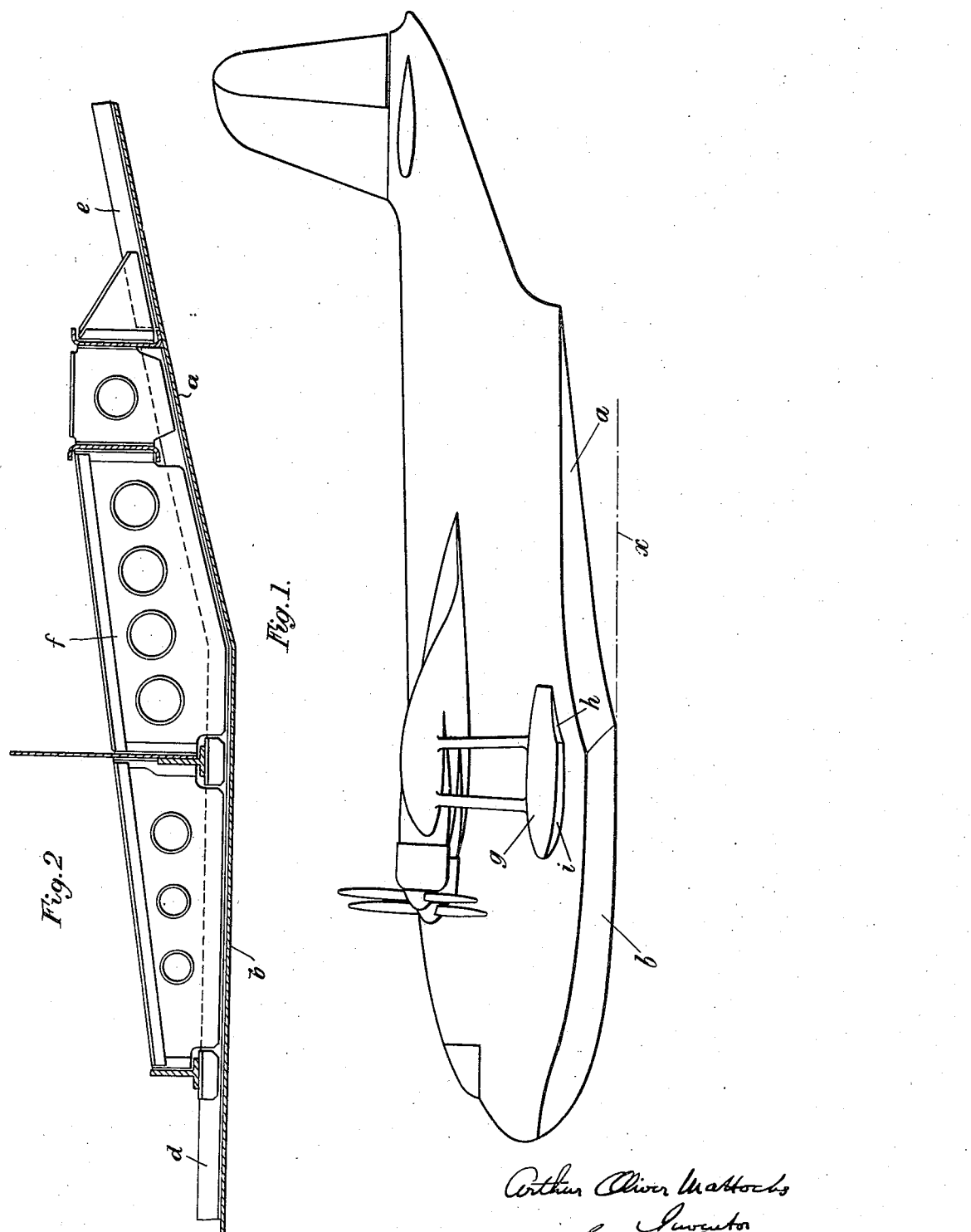

2,180,250

UNITED STATES PATENT OFFICE 2,180,250

HULL OF FLYING OR MOTOR BOATS

Arthur Oliver Mattocks, Rochester, England, assignor to Short Brothers (Rochester & Bedford) Limited, Rochester, England Application October 20, 1938, Serial No. 236,087
In Great Britain June 14, 1938

3 Claims. (Cl. 114—66.5)

This invention relates to hydroplane vessels including the hulls of boats and of flying boats and floats and the object of this invention is to reduce the drag on the water in the preliminary portion of gathering speed, while the boat or float is water-borne, and then without increasing the drag to permit the boat or float to rise on the surface or to separate from the water with the minimum of disturbance.

It is well known to provide a step on the under portion of the hull or float (hereinafter referred to as a hull) in order to break the flow of water and prevent it clinging to the portion of the hull behind the step while flying or hydroplaning speed is being attained.

The known stepped constructions, however, create a considerable amount of drag on the water at low speeds, impeding the acceleration of the boat and delaying the moment of "unsticking". In aircraft the sudden break in the planing bottom formed by the step also creates a considerable amount of drag in actual flight after the aircraft has left the water.

I have found by experiment that an actual step is unnecessary, providing the under surface of the boat is formed with an abrupt change in direction of the aft planing bottom (i. e., the bottom part aft of where the step is usually located) relatively to the fore planing bottom (i. e., the bottom part forward of where the step is usually located), the aft planing bottom rising upwardly in concave form directly from the rear of the fore planing bottom. The concave aft planing bottom continues to the after portion of the hull.

The invention is characterised by the abrupt change in form of the aft planing bottom rising in a concave manner. A change in form of the planing bottom from the fore planing bottom to the aft planing bottom, in which the tail portion extends in a convex curve or in a straight line, would not satisfy the requirement for "unsticking", because the water will cling to the under portion if so curved, or even if trailing off in an upward direction in a straight line.

A stepped hull planing bottom is a type of which the after planing bottom is at a higher level with respect to the hull datum line than the fore planing bottom, the connection of the two bottom parts being made by a vertical or nearly vertical plane whereas in a stepless hull planing bottom, according to this invention, the fore and aft portions of the planing bottom are respectively at the same level relative to the hull datum as for a stepped hull, but the connection of these two portions of the planing bottom is made by a curve or by flats forming a virtual curve. It is essential that this connection curve be concave relative to the datum of the hull. The datum line of the hull is tangential to fore body keel at the step position.

It is necessary in eliminating the step to ensure that the water leaving the dividing line is, by reason of its inertia, free from contact with the aft planing bottom, and this can only be done by an abrupt change of shape, in which the concavity of the aft portion enforces the creation of an air gap into which the water cannot flow or be led into contact by the suction when the necessary speed has been attained. It is evident, therefore, that the stepless hull requires to have the aft planing bottom at a higher level than the datum line and that no mere inclination upwards of the bottom merging from fore to aft will satisfy this requirement. An upward rise whether in the form of a concave curve, or composed of successive changes in angle which together constitute a concave under surface, will still come within the ambit of this invention.

The above construction in addition to its hydrodynamic and aerodynamic advantages in reducing water drag when attaining flying speed and reducing air drag when flying, has the constructional advantage of avoiding discontinuity of the planing bottom inseparable from a stepped hull construction with consequent localising of the stresses existing in the after planing bottom. With the construction permissible with a stepless hull, the after planing bottom stresses are more evenly distributed. As a result of this stepless planing bottom stiffeners are able to be reduced in depth and the step plate dispensed with, thereby effecting a saving in weight. Maintenance is simplified due to the freedom of the construction and accessibility of the planing bottom within the boat in the region of the concave part.

Although this invention has been described with particular reference to hulls of flying boats, it is also applicable to floats for aircraft and also to other fast motor water craft whose underwater surfaces are sometimes fitted with steps.

In order more particularly to describe and ascertain the nature of this invention and in what manner it is to be carried into effect, the invention will now be more particularly described in connection with flying boats as shown in the accompanying drawing, in which—

Fig. 1 is a side elevation of a flying boat showing a steppless hull according to this invention.

Fig. 2 is a similar view to Fig. 1 but showing the construction of the improved planing bottom.

In the usual stepped hull construction, the whole of the aft planing bottom is at a higher level than of the fore planing bottom, the connection of these bottoms being made by a plate which is vertical or nearly vertical to form a step at the underside of the hull. In forming this step, it is necessary not only to fit the step plate but also to provide deep stiffeners in order to take the undistributed loads arising from the discontinuity of the planing bottom while the intermediate stiffener or bearer for the step itself also requires to be made of considerable depth.

With the stepless hull according to this invention as shown in Fig. 1, however, the fore and aft planing bottoms b and a are of V-shape in cross-section, the fore planing bottom forming at each side of the keel a laterally inclined fore or side surface and the aft planing bottom also forming at each side of the keel a laterally inclined fore or side surface. The rear part of the aft planing bottom a is at a higher level than the datum line x forming a rearward continuation of the fore planing bottom. The forward part of the aft planing bottom gradually extends down in a curve of concave form directly to the rearmost edge of the fore planing bottom b. Thus the aft planing bottom a rises abruptly from the rear edge of the fore planing bottom b in a concave curve a tangent to which, at the point of junction of the fore and aft planing bottoms, makes an angle of less than 45° to the datum line x continues rearwardly and upwardly to the after portion of the hull of the flying boat.

As will be seen from Fig. 2, the deep stiffeners hitherto required are entirely dispensed with and, moreover, the aft planing bottom a extends as a continuation of the fore planing bottom b and the stiffeners d and e also extend continuously across the inner surface of the planing bottoms. A local stiffening plate or bearer f is provided at the point of intersection of the fore and aft planing bottoms b and a but this plate can be made shallower and lighter than in the stepped hull construction for a given size of boat.

In Fig. 1 the invention is also shown with a wing tip float g, the aft planing bottom h of which is constructed and arranged in a similar manner to that of the planing bottom a, while the fore planing bottom i is of the usual form.

What I claim as my invention and desire to secure by Letters Patent is:

1. A hydroplane vessel having its undersurface formed with a fore planing bottom and an aft planing bottom, both of said planing bottoms being of V-shape in cross-section forming at each side of the keel an inclined fore surface and an inclined aft surface, the whole of the inclined aft surface rising upwardly and rearwardly in concave form directly from the rear of each front surface.

2. A hydroplane vessel having its undersurface formed with a fore planing bottom of V-cross-section and an aft planing bottom of V-cross-section, the whole of each side surface of the V aft planing bottom being longitudinally curved to a concave form which merges directly without a step into the rear edge of the side surface of the fore planing bottom.

3. A hydroplane vessel having its undersurface formed with a fore planing bottom and an aft planing bottom, both of said planing bottoms being of V-shape in cross-section, forming at each side of the keel an inclined fore surface and an inclined aft surface, the whole of the inclined aft surface rising upwardly and rearwardly in a concave curve, a tangent to which curve at the point of junction of the fore and aft planing bottoms makes an angle of less than 45° to a datum line forming a continuation of the fore planing bottom.

ARTHUR OLIVER MATTOCKS.